Jan. 18, 1966 R. H. GLATTHORN ETAL 3,230,340
ARC WELDING APPARATUS AND METHOD OF ARC WELDING
Filed April 29, 1963 4 Sheets-Sheet 1

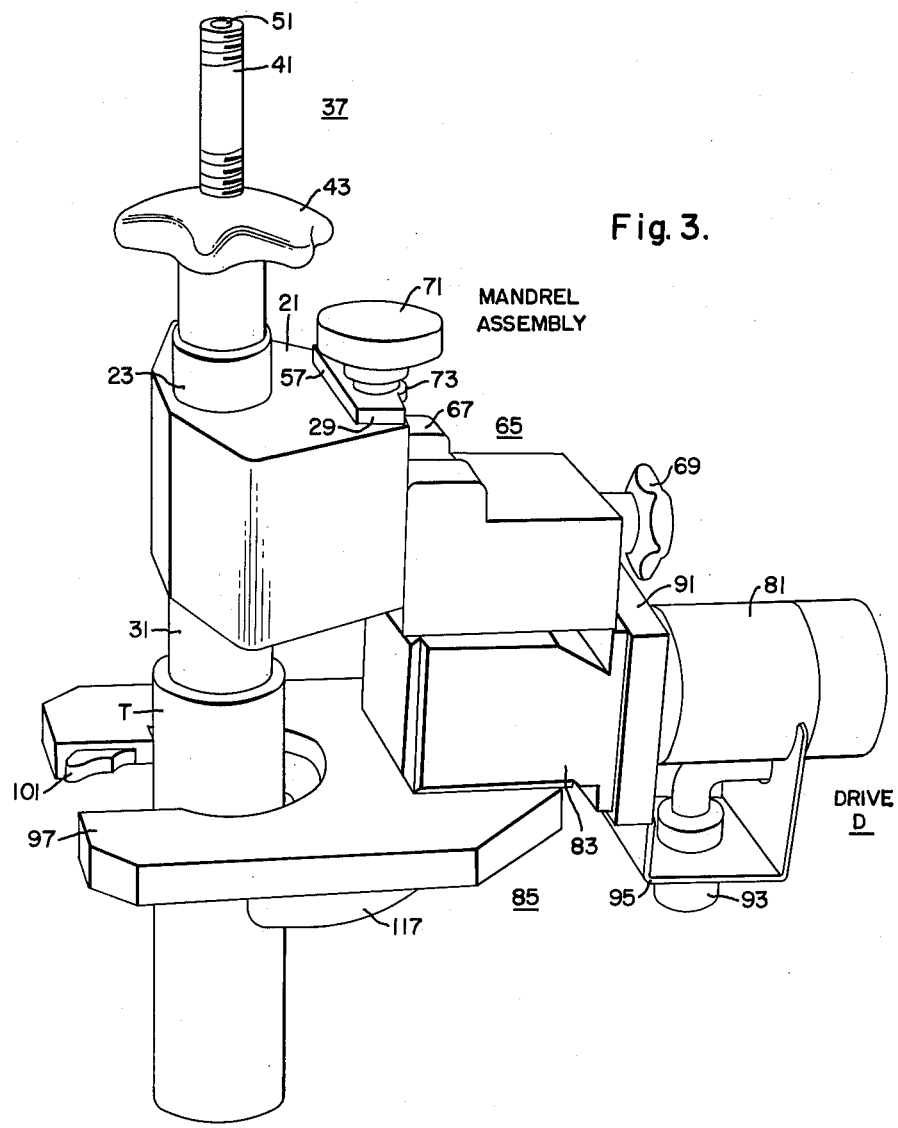

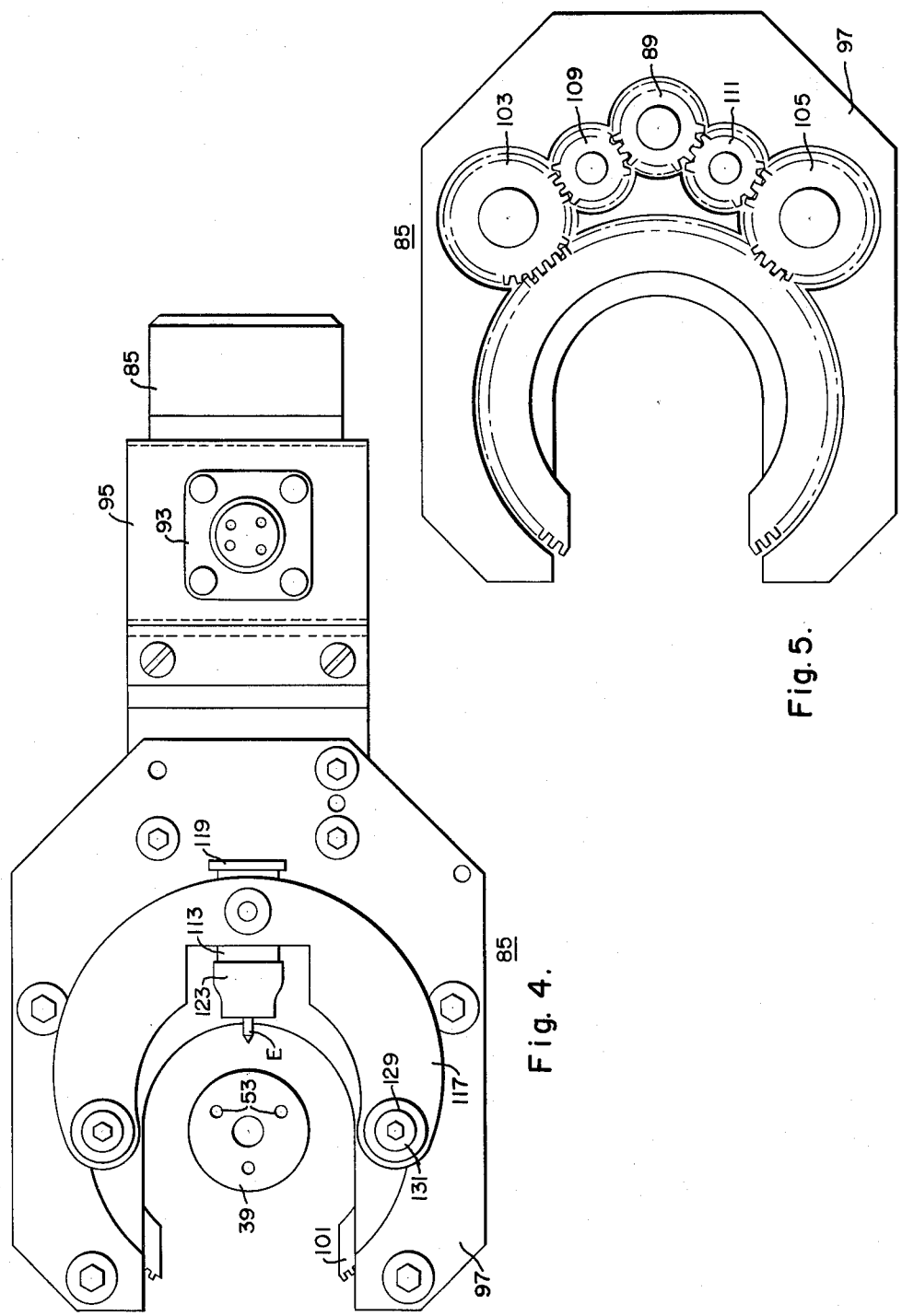

United States Patent Office 3,230,340
Patented Jan. 18, 1966

3,230,340
ARC WELDING APPARATUS AND METHOD
OF ARC WELDING
Raymond H. Glatthorn, Nether Providence Township, Delaware County, and Franklin W. Coffman, Prospect Park, Pa., assignors to Westinghouse Electric Corporation, Pittsburgh, Pa., a corporation of Pennsylvania
Filed Apr. 29, 1963, Ser. No. 276,444
5 Claims. (Cl. 219—125)

This invention relates to arc welding and has particular relationship to the art of joining an enclosure such as a tubular member to an abutting member. This invention relates to a application, Serial No. 276,443, filed concurrently herewith to Raymond H. Glatthorn and Franklin W. Coffman, for Arc Welding Apparatus and Method of Arc Welding.

Both this application and the above-mentioned application filed concurrently herewith relate to the welding of an enclosure to an abutting member where it is essential that the seal between the members be reliably pressure tight. For this purpose, it is necessary that the joint between the members be sealed and a precision weld having a penetration of 100% be produced. Application 276,443 is directed to the producing of such a seal in which the 100% penetration is achieved by welding the internal region and the external region of the joint separately. First, the joint is welded internally of the enclosure, the weld penetrating part way through the joint; and then a second weld is produced externally of the enclosure along the joint which fuses into the first weld producing a welded joint in which the weld has a 100% penetration.

It is an object of this invention to provide arc welding apparatus for producing the above-described external weld; it is another object of this invention to provide a method of arc welding in the practice of which a reliable and sound external joint of the type described above shall be produced. It is also an object of this invention to provide apparatus and a method of arc welding in the use and practice of which a joint between an enclosure and an abutting member shall be sealed pressure tight by a sound external weld which shall fuse into an internal weld previously produced.

It is a general object of this invention to provide novel apparatus for, and a novel method for arc-welding a joint between an enclosure and an abutting member.

This invention in one of its aspects arises from the realization that to produce a sound leak-proof welded seal between the tubular member and the abutting member, it is essential that the distance between the welding electrode and the joint between the abutting members be maintained substantially constant. In accordance with this aspect of this invention, apparatus is provided which has a mandrel assembly including a lock tube which engages the enclosure and is secured thereto. A welding electrode, preferably of the non-consumable type, is suspended from the mandrel assembly generaly perpendicular to the joint and with its tip in welding relationship with, and spaced the proper precise distance with respect to the joint. The electrode is moved around the joint with the tip maintained substantially the precise distance from the joint and an arc is maintained between the electrode and the joint to produce a fusion weld penetrating the desired distance into the joint. Specifically, this distance is such that the weld fuses into the internal weld previously produced. To avoid contamination, it is desirable that the arc be shielded in an atmosphere of a protective gas which is preferably an inert gas and specifically may be a combination of two parts helium and one part argon.

Another aspect of this invention arises from the discovery that as the external joint is being welded, the internal region of the joint becomes hot. This region would then tend to become oxidized unless properly protected.

In accordance with another aspect of this invention a protective gas is maintained on the internal region of the weld during the welding operation. This gas, like the gas shielding the arc, may also be an inert gas such as argon or helium. This gas may be injected into the internal region through the mandrel assembly.

The novel features considered charactersitic of this invention are disclosed generally above. For a clearer understanding of this invention both as to its organization and to its method of operation together with additional objects and advantages thereof, reference is made to the following description of a specific embodiment taken in connection with the accompanying drawings, in which:

FIG. 3 is a view in perspective showing the apparatus according to this invention in its position during a welding operation;

FIG. 4 is a view in elevation looking in the direction of the arrow IV of FIG. 2;

FIG. 5 is a view in elevation of the gear box with the cover removed of the apparatus according to this invention;

Figure 1:
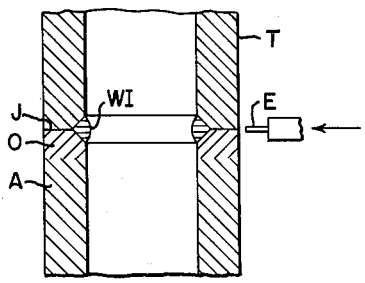
FIGURE 1 is a fragmental view in section showing the enclosure and the abutting member in position to be welded.

The apparatus shown in the drawings is used to weld externally the joint J between a tubular member T and an abutting member A (FIGS. 1, 3). Typically, in the practice of this invention the tubular member is composed of a nickel-copper alloy designated in the art as Monel. The member A is also composed of the nickel-copper alloy but over its tip it has an overlay O of a nickel-copper alloy to which the oxidizing elements such as aluminum and/or titanium have been added. The joint J to be welded extends between the member T and the overlay O.

Typically the joint J will have been welded internally at WI. The internal weld WI extends part way through the joint J. In the use of the apparatus disclosed in accordance with this invention, an external weld is produced at the joint J which fuses into the internal weld WI to produce a welded joint of 100% penetration.

Figure 2:
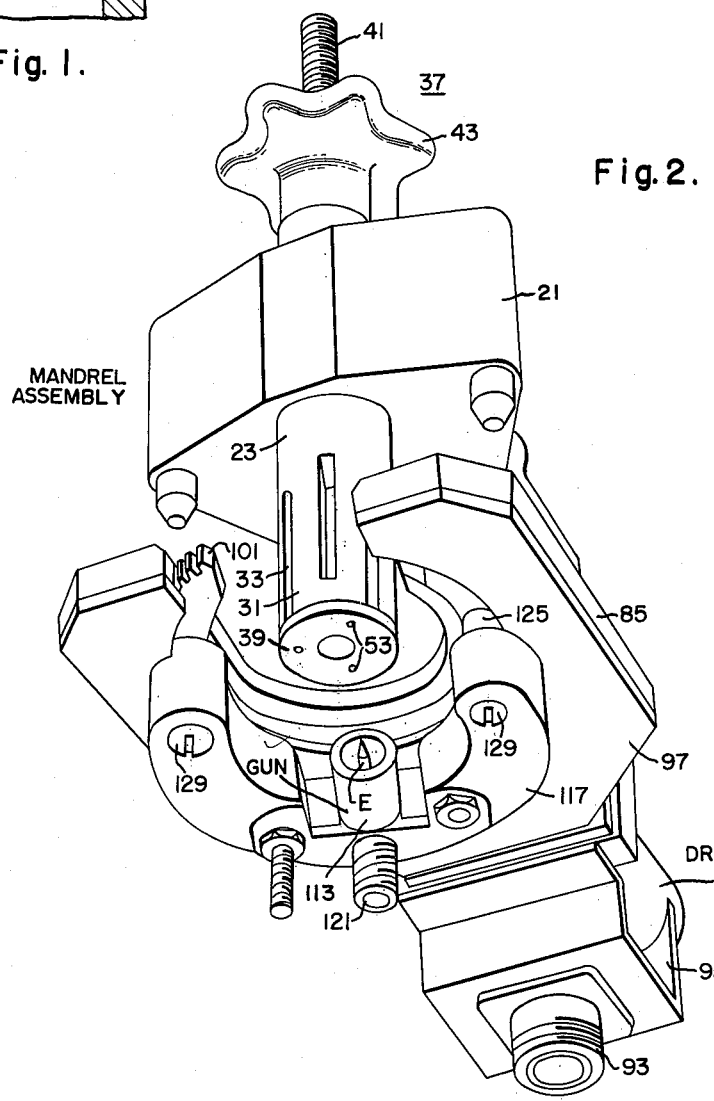
FIG. 2 is a view in perspective from a position looking towards the lock-tube of the mandrel assembly of apparatus according to this invention.
Figure 8:
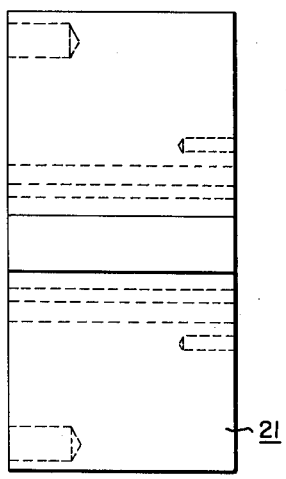
FIG. 8 is a view in side elevation of the head for the mandrel assembly.

The apparatus according to this invention includes a Mandrel Assembly (FIGS. 2, 3), a Drive and a Gun. In the use of this apparatus, the Mandrel Assembly is locked into the tubular member A coaxial with the axis of this member, the Gun is set so that the electrode E is in welding relationship with the external region of the joint J, an arc is fired, and the Gun is rotated with the arc burning to produce a weld which fuses into weld WI. The arc is shielded and the internal region of the joint is also shielded.

Figure 6:
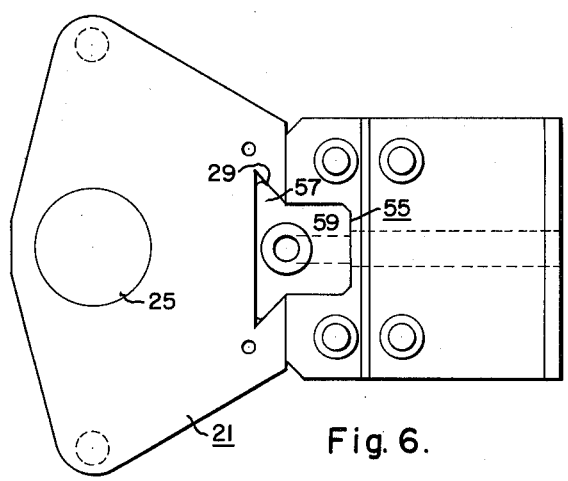
FIG. 6 is a view in top elevation showing a sub-assembly of apparatus according to this invention which includes a head that carries the mandrel assembly, the dove-tail block and the height adjusting block.
Figure 9:
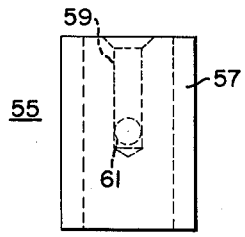
FIG. 9 is a view in side elevation of the dove-tail block.
Figure 7:
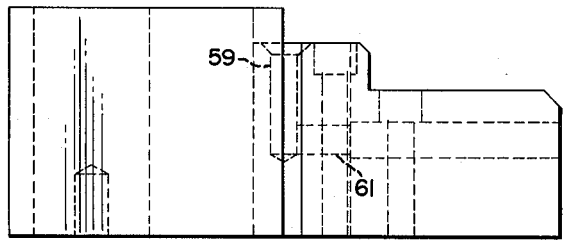
FIG. 7 is a view in side elevation of this assembly.
Figure 12:
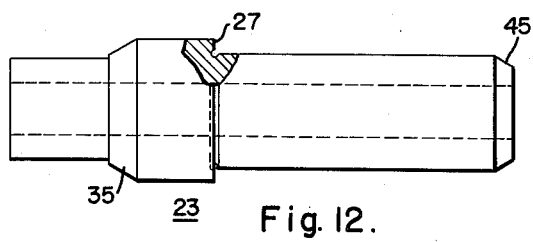
FIG. 12 is a view in side elevation of the supporting shaft for the mandrel assembly.

The Mandrel Assembly includes a head 21 into which a supporting shaft 23 (FIG. 12) is secured. Preferably the shaft 23 is a press fit in an opening 25 (FIG. 6) of the head 21. The shaft 23 abuts the head 21 in a shoulder 27.

The head 21 is a block typically of hot rolled steel block and of generally trapezoidal cross-section. At its narrow end, the head 21 has a female dove-tail slot 29.

The Mandrel Assembly also includes a lock-tube 31, typically of hot rolled steel, including a plurality of slots 33, extending from opposite ends. The slots 33 lend the lock-tube 31 resilience so that it may be readily expanded against the wall of the tubular member T.

Figure 10:
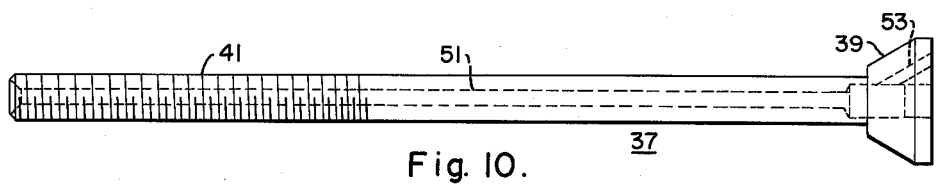
FIG. 10 is a view in side elevation of the clamping rod of the mandrel assembly.
Figure 11:
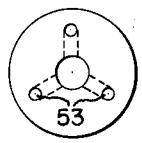
FIG. 11 is a view in end elevation of this clamping rod.

The lock-tube 31 is internally beveled at the ends and is held against an externally beveled shoulder 35 projecting from the shaft 23 by an externally threaded clamping tube 37 (FIG. 10) having a tapered projection 39 at the end which engages the bevel at the lower end of the lock-tube 31. The external thread 41 on the clamping-tube 37 engages a knob 43 which abuts the tapered end 45 of the shaft 23.

In the use of the apparatus the lock-tube 31 is inserted in the tubular member T and the knob 43 is turned causing the clamping tube 37 to move outwardly with reference to the tubular member T. The tapered projection 39 on the clamping tube 37 causes the lock-tube 31 to expand and firmly engage the tubular member T.

The clamping tube 37 has a central opening 51 which communicates with a plurality of openings 53 passing at an angle through the projection 39. A shielding gas, for example argon, is supplied to the central opening 51 and passes through the openings 53 in the projection purging the internal region of the joint J and preventing oxidation of the joint by reason of the elevated temperature resulting from the welding arc impinging on the external region of the joint J. The opening 51 in the clamping tube T does not extend through the projection and the gas which flows through the clamping tube can pass only through the openings 53 in the projection.

The Mandrel Assembly also includes a male dove-tail block 55 which is of generally rectangular cross-section having the male dove-tail 57 extending from one end. This male dove-tail 57 engages the female dove-tail 29 of the head 21. The dove-tail block has threaded longitudinal and transverse openings 59 and 61.

The Mandrel Assembly also includes a height-adjustment block 65 having a slot 67 into which the body of the dove-tail block 55 is inserted. The dove-tail block 55 is secured to the height-adjustment block 65 by a knob 69 which turns a bolt that passes into the transverse threaded opening 61 and may be tightened to hold the height-adjustment block 65 and the dove-tail block 55 together. The dove-tail block 55 and the height-adjustment block 65 secured to it may be raised and lowered by turning a knurled knob 71 connected to a screw engaging the longitudinal opening 59 in the dove-tail block 55. The screw is held in position by a retaining plate 73.

The Drive D includes a motor 81 connected to a gear box 83 including gears (not shown) for deriving a lower speed than that available from the motor shaft. The motor 81 and gear box 83 may be conventional and typically may be procured from J. M. Schmidt Precision Tool Company. The Drive also includes a gear assembly 85 connected to the low speed shaft 89 extending from the gear box 83.

The gear box 83 is secured to the height-adjustment block 65. The motor 81 is suspended from the gear box 83 and is supported by a rectangular yoke 91 connected to the gear box 83. Power is supplied to the motor through a receptacle 93 connected to the motor and supported in a bracket 95 connected to the yoke 91. The gear assembly 85 is mounted in a generally horseshoe-shaped box 97, and this box 97 is bolted to the gear box 83.

The gear assembly includes a large gear 101, a sector of which is cut away so that it has the general form of a horseshoe. The opening in the cut-away permits the gear 101 to be moved laterally adjacent the tubular member T. This large gear 101 is driven by a pair of smaller gears 103 and 105 (FIG. 5) coupled to the low speed shaft 89 of the gear box 83 through a pinion 107 and respective idlers 109 and 111. The driving gears 103 and 105 are spaced a greater distance than the opening in the large gear 101, so that under all circumstances the large gear is driven by at least one of the drive gears 103 or 105.

The Gun includes an electrode E which is mounted in a collet (not shown) supported in a cylindrical tube 113 mounted on a yoke 117. The electrode E may be secured in the collet by a knurled-head screw 119 which is screwed into the supporting tube 113 in which the collet is disposed. The supporting tube is connected with a power-and-gas supply terminal 21 which extends perpendicularly from the center of the yoke 117. This terminal is connected to a gas-and-power conductor (not shown) which supplies power to the electrode E and gas through channels in the tubular support 113 for the collet. The gas passes through a gas cup 123 which distributes the gas stream around the arc so that the arc is protected from the atmosphere. Typically, the gas is a mixture of two parts helium and one part argon.

The yoke 117 may be composed of a conducting material such as brass but is insulated from the mountings. The yoke is connected to the large gear 101 by bolts but is insulated from the large gear 101 by bushings 125 between the yoke and the gear box 97 and washers 129 between the bolt heads 131 and the yoke.

In the use of the apparatus the lock-tube 31 is engaged with the inner surface of the tubular member T. The knob 43 on the clamping tube 37 is then turned causing the lock-tube to expand and be secured to the tubular member T firmly. The height adjusting knob 71 is then turned until the Drive and Gun are positioned with the electrode E in welding relationship with the joint J. Shielding gas in then transmitted through the Gun and through the clamping tube 37. The arc is then fired with the aid of a high frequency stabilizer and the Drive D energized so that the arc is rotated by the large gear 101 around the joint J producing a weld. The weld penetrates and fuses with the internal weld WI, thus producing a joint in which the weld has 100% penetration. The electrode extends generally perpendicularly to the joint and remains in this position as it is rotated around the joint. In the use of this apparatus it has been found that sound welds are produced.

While a preferred embodiment of this invention has been disclosed herein, many modifications thereof are feasible. This invention then is not to be restricted except insofar as is necessitated by the spirit of the prior art.

We claim as our invention:

1. Apparatus for arc welding a joint between an enclosure and an abutting member externally of said enclosure, comprising mandrel means including a lock-tube to be inserted in, and to engage internally, said enclosure and a clamping tube connected to said lock-tube for securing said lock-tube to said enclosure, means connected to said clamping tube for transmitting a shielding gas to said joint internally of said enclosure, a welding electrode suspended from said mandrel means in welding relationship with said joint, and means connected to said welding electrode for moving said electrode around said joint.

2. Apparatus for arc welding a joint between an enclosure and an abutting member externally of said enclosure, said apparatus comprising mandrel means including means for engaging said enclosure internally, an electrode suspended from said mandrel means in external welding relationship with said joint and means connected to said electrode and also suspended from said mandrel means for moving said electrode around said joint in welding relationship with said joint, said mandrel means including channel means transmitting shielding gas to the region of said joint internally of said enclosure.

3. Apparatus for arc welding externally a joint between a tubular member and an abutting member, said joint lying generally in a plane, the said apparatus comprising a mandrel to be inserted in said tubular member generally coaxial with said tubular member, a gear suspended from said mandrel coaxial with said tubular member and generally in the plane of said joint, an electrode extending radially from said gear towards said joint, and means for rotating said gear to rotate said electrode about said joint.

4. Appparatus for arc welding a joint between an enclosure and an abutting member externally of said enclosure, said apparatus comprising mandrel means including means for engaging said enclosure internally, a gear suspended from said mandrel means in the plane of said joint, an electrode extending from said gear in welding relationship with said joint, and drive means supported by said mandrel means connected to said gear for moving said gear around said joint to move said electrode around said joint in welding relationship with said joint.

5. Apparatus for arc welding externally a joint between an enclosure member and an abutting member, the said apparatus including an arc-welding electrode mounted on a mandrel movable about the axis of said mandrel, said mandrel including channel means transmitting a protective gas, and said mandrel extending into one of said members with said electrode extending into arc welding relationship with said joint, from a position external of said one member, and with said channed means terminating in a position to project protective gas effectively on said joint internally of said one member, and means for moving said electrode along said joint externally of said member in arc welding relationship with said joint while projecting a protective gas along said channel means on said joint within said members.

References Cited by the Examiner
UNITED STATES PATENTS

| | | | |
|---|---|---|---|
| 1,508,713 | 9/1924 | Noble | 219—125 |
| 2,721,248 | 10/1955 | Kirkpatrick | 219—125 |
| 2,792,490 | 5/1957 | Risch et al. | 219—137 |
| 2,817,745 | 12/1957 | Pilia et al. | 219—125 X |
| 2,819,517 | 1/1958 | Pursell | 219—137 X |
| 2,894,111 | 7/1959 | McNutt | 219—125 X |
| 3,114,830 | 12/1963 | Wotitzky | 219—125 |
| 3,125,670 | 3/1964 | Hawthorne | 219—125 |
| 3,159,734 | 12/1964 | Cooksey et al. | 219—125 |

ANTHONY BARTIS, *Acting Primary Examiner.*

JOSEPH V. TRUHE, *Examiner.*